No. 699,323. Patented May 6, 1902.
W. A. HOLLIDAY.
TOOL HANDLE.
(Application filed Feb. 15, 1902.)

(No Model.)

Witnesses:
R. A. Boswell
N. A. Mayhew

Inventor.
William A. Holliday,
By Franklin N. Hough
Attorney.

UNITED STATES PATENT OFFICE.

WILLIAM A. HOLLIDAY, OF CADDO, INDIAN TERRITORY.

TOOL-HANDLE.

SPECIFICATION forming part of Letters Patent No. 699,323, dated May 6, 1902.

Application filed February 15, 1902. Serial No. 94,293. (No model.)

*To all whom it may concern:*

Be it known that I, WILLIAM A. HOLLIDAY, a citizen of the United States, residing at Caddo, Choctaw Nation, Indian Territory, have invented certain new and useful Improvements in Tool-Handles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tool-handles; and it consists in the provision of a hollow metallic handle adapted to have interchangeable heads, as hoes, shovels, and spades, and more specifically my invention comprises a hollow metallic handle having, preferably, a tapering end, through which the shank portion of the head to be attached thereto is passed, and the provision of a conical-shaped washer which has an apertured apex and a threaded aperture in its enlarged end adapted to receive the shank portion of the head of the tool, which is screwed through the tapering end of the handle and through said washer to hold the parts securely together.

The invention consists, further, in the various details of construction, combination of parts, and arrangement of details, which will be hereinafter more fully described and then specifically defined in the appended claim.

The invention is clearly illustrated in the accompanying drawings, which, with the letters of reference marked thereon, form a part of this application, and in which drawings similar letters of reference marked thereon indicate like parts, and in which drawings—

Figure 1:
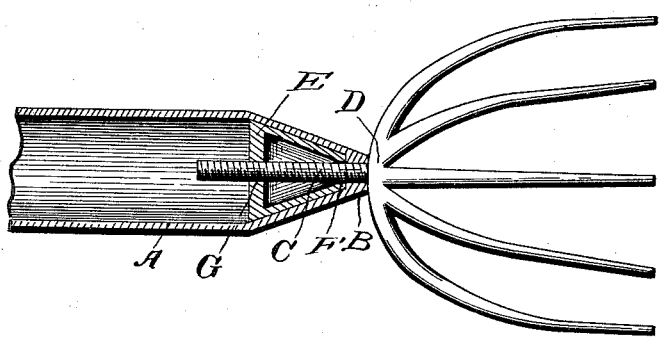
Figure 2:
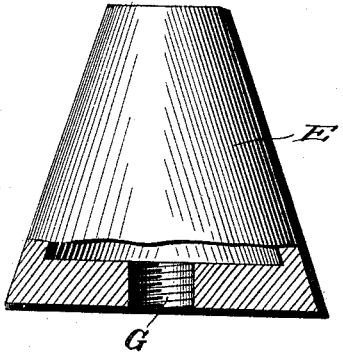
Figure 3:
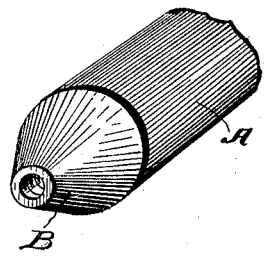

Figure 1 is a central longitudinal sectional view through a hollow handle, showing the means for holding the head to the handle. Fig. 2 is an enlarged detail view of the conical-shaped washer. Fig. 3 is a detail view of the tapering end of the handle.

Reference now being had to the details of the drawings by letter, A designates the handle, made by rolling same from a piece of metal and soldering or brazing the meeting edges. The end of the handle designed to receive the shank portion of the head is preferably tapered, as seen at B, and has an opening in its apex to receive the threaded shank portion C of the head D, whether of a hoe, pitchfork, or whatever device it is desired to attach to the handle. Fitted within the tapering end of the hollow handle is a conical-shaped washer E, the apex of which is apertured, as at F, to receive the shank portion of the head, and the enlarged end of said washer is provided with an aperture G, which is screw-threaded and adapted to receive the threaded shank portion C. The outer tapering wall of said washer conforms to the inner tapering surface of the conical end of the handle, so that when the washer is adjusted in place it will come into contact with the inner surface of the end of the handle, and when the shank portion of the head is screwed through the aperture in the washer the parts may be held tightly together, which will cause the washer to clamp securely against the inner wall of the end of the handle.

From the foregoing, when taken in connection with the drawings, it will be noted that I produce a novel handle to which a hoe, pitchfork, shovel, or other head may be easily and quickly applied and in case of breakage of the head a new one may be quickly adjusted in place.

If preferred, the conical-shaped end of the handle may be inserted into the socket of an ordinary hoe or other tool and made fast by soldering or brazing, thereby making said handle and tool fastenings solid.

Having thus described my invention, what I claim to be new, and desire to secure by Letters Patent, is—

As an improved article of manufacture, a hollow handle having a tapering end, which is conical-shaped with a threaded aperture through the apex thereof, and a flattened shoulder adjacent to the inner end of the aperture in said apex, combined with a conical-shaped washer, the apex of said washer bearing against said shoulder, with the outer circumference of said washer in contact with the inner tapering wall of the handle, and the head having a threaded shank portion passing through the threaded aperture in the apex of the handle and the threaded aperture in the enlarged end of said washer, whereby the parts are securely held together, as set forth.

In testimony whereof I hereunto affix my signature in presence of two witnesses.

WILLIAM A. HOLLIDAY.

Witnesses:
JAS. E. COSGROVE,
JOHN DRAKE.